United States Patent
Liao et al.

(10) Patent No.: US 8,432,774 B1
(45) Date of Patent: Apr. 30, 2013

(54) TRACKING SERVO AND METHOD FOR TRACKING OPTICAL DISC AND OPTICAL DISC DEVICE USING THE TRACKING SERVO

(71) Applicants: Ying-Liang Liao, New Taipei (TW); Chih-Chun Chen, New Taipei (TW); Chih-Lung Hsieh, New Taipei (TW)

(72) Inventors: Ying-Liang Liao, New Taipei (TW); Chih-Chun Chen, New Taipei (TW); Chih-Lung Hsieh, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/631,889

(22) Filed: Sep. 29, 2012

(30) Foreign Application Priority Data

May 23, 2012 (TW) .............................. 101118277 A

(51) Int. Cl.
*G11B 7/00* (2006.01)
(52) U.S. Cl.
USPC ....................................................... 369/44.28
(58) Field of Classification Search ........................ None
See application file for complete search history.

(56) References Cited

U.S. PATENT DOCUMENTS

| | | | | |
|---|---|---|---|---|
| 4,855,977 A * | 8/1989 | Getreuer et al. | ........... | 369/30.17 |
| 5,038,333 A * | 8/1991 | Chow et al. | ................ | 369/44.28 |
| 5,088,075 A * | 2/1992 | Yokota | ....................... | 369/30.16 |
| 5,101,386 A * | 3/1992 | Kojima et al. | ............. | 369/44.28 |
| 5,197,058 A * | 3/1993 | Bell et al. | ................... | 369/44.28 |
| 5,202,865 A * | 4/1993 | Yanagi | .......................... | 369/30.1 |
| 5,268,883 A * | 12/1993 | Yamaguchi et al. | ........ | 369/30.13 |
| 5,329,509 A * | 7/1994 | Takahara et al. | ........... | 369/44.26 |
| 5,497,360 A * | 3/1996 | Takahara et al. | ........... | 369/44.28 |
| 5,675,563 A * | 10/1997 | Sasaki | ......................... | 369/44.28 |
| 5,870,356 A * | 2/1999 | Ikeda | .......................... | 369/30.15 |
| 5,914,922 A * | 6/1999 | Supino et al. | .............. | 369/44.28 |
| 6,157,599 A * | 12/2000 | Yamashita et al. | ......... | 369/44.28 |
| 2002/0018405 A1* | 2/2002 | Kumagami et al. | ........ | 369/30.17 |
| 2004/0240338 A1* | 12/2004 | Fani et al. | .................. | 369/44.28 |
| 2006/0098538 A1* | 5/2006 | Takahashi | .................. | 369/30.13 |

\* cited by examiner

*Primary Examiner* — Peter Vincent Agustin
(74) *Attorney, Agent, or Firm* — Altis Law Group, Inc.

(57) ABSTRACT

A tracking method executed by an optical disc device. The optical disc device includes an optical head for emitting light to read or write data from or to an optical disc. The tracking method includes steps of: providing a table for listing a plurality of predetermined track classes, and a plurality of tracking errors; calculating the number of tracks between a current track in which the optical head is currently positioned and a target track from or to which the optical head reads or writes data; determining whether the number of tracks reaches a predetermined number; searching the table for the corresponding tracking errors when the number of tracking error reaches a predetermined number; calculating second jumping tracks based on the first jumping tracks and the found tracking errors; and driving the optical head to move to the second jumping tracks for tracking.

14 Claims, 3 Drawing Sheets

| Track Classes | Tracking Error |
|---|---|
| ⋮ | ⋮ |
| -801~-900 | A1, A2 |
| -701~-800 | B1, B2 |
| ⋮ | ⋮ |
| 501~600 | C1, C2 |
| 601~700 | D1, D2 |
| 701~800 | F1, F2 |
| 801~900 | G1, G2 |
| ⋮ | ⋮ |

FIG. 2

TRACKING SERVO AND METHOD FOR TRACKING OPTICAL DISC AND OPTICAL DISC DEVICE USING THE TRACKING SERVO

BACKGROUND

1. Technical Field

The present disclosure relates to optical disc devices, particular to a tracking servo and method for tracking an optical disc.

2. Description of Related Art

An optical disc device is capable of reading or writing data from or to an optical disc, such as a CD, a DVD or an HD DVD. The optical disc has many tracks for storing data. The optical disc device includes a spindle motor, an optical head, a focus servo, and a tracking servo. When the optical disc device reads the data from the optical disc, the optical disc device performs the following operations: driving a spindle motor to rotate the optical disc; moving the optical head to inner tracks of the optical disc; driving a focus servo, so the laser light emitted by the optical head is projected on the optical disc; driving a tracking servo to move lens of the optical head so the laser light spot tracks one single data track; reading a track number of the current track to obtain the position of the current track; performing a long tracking for moving the optical head towards the target track from the current track; performing tracking and reading the track number of the track in which the optical head is currently located to obtain the difference between the track number of the current track and that of the target track; performing a short tracking for moving the laser light spot to the target track; and performing tracking and accessing data. However, the conventional optical disc device always performs the long tracking several times, which takes up a large amount of time during tracking.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

FIG. 2 shows a table for listing track classes and tracking errors corresponding to the track classes stored in the optical disc device in accordance with an embodiment.

DETAILED DESCRIPTION

Tracking method of a typical optical disc device includes performing long tracking when the number of tracks between a current track and a target track exceeds a predetermined value, such as 500, and performing short tracking when the number of tracks between the current track and the target track does not exceed the predetermined value. But the tracking method of the typical disc device consumes a lot of time. This invention provides an optical disc device, and a tracking method to shorten tracking time.

Figure 1:
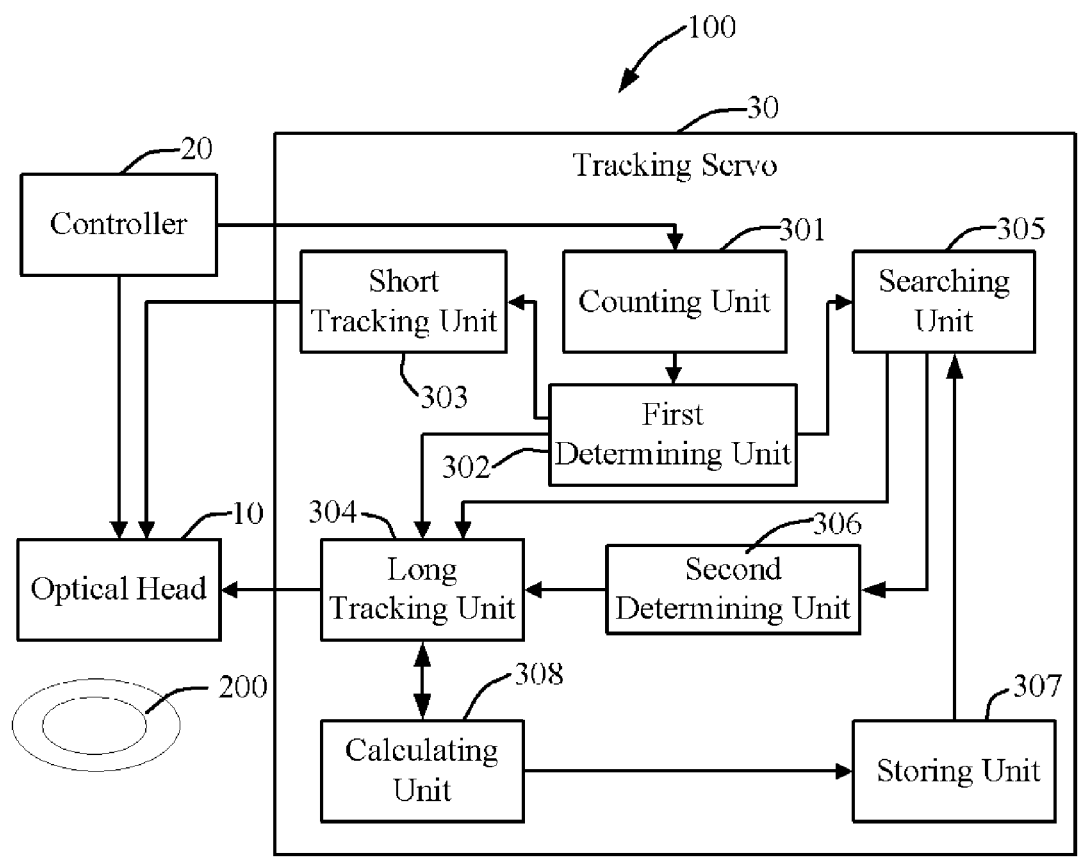
FIG. 1 shows a functional block diagram of an optic disc device in accordance with an embodiment.

Referring to FIG. 1, the optical disc device 100 is capable of reading data from or writing data to an optical disc 200. The optical disc device 100 includes an optical head 10, a controller 20, and a tracking servo 30. The optical head 10 emits lights to the optical disc 200 for reading data and writing data. The controller 20 is configured to obtain a current track number of a current track which the optical head 10 is currently positioned at, and a target track member of a target track from which the optical head reads data or to which the optical head writes data. The tracking servo 30 is configured to control the optical head 10 to move from the current track to the target track.

The tracking servo 30 includes a counting unit 301, a first determining unit 302, a short tracking unit 303, a long tracking unit 304, a searching unit 305, a second determining unit 306, a storing unit 307, and a calculating unit 308.

Referring to FIG. 2, the storing unit 307 stores a table 40. In this embodiment, the table 40 in the storing unit 307 lists a plurality of track classes, and a plurality of tracking errors associated with the corresponding track classes. The track classes are defined based on amount of tracks in which the optical head 10 moves with respect to the optical disc 200. In this embodiment, each track class is defined to have 100 tracks. When the optical head 10 moves from the inner tracks to the outer tracks, the amount is negative value. When the optical head 10 moves from the outer tracks to the inner tracks, the amount is positive value. For one example, one track class is from −500 to −600. For another example, one track class is from 500 to 600. In this embodiment, the tracking errors stored in the storing unit 307 are erased when the optical disc device 10 is turned off. How to obtain the tracking errors is described below.

The counting unit 301 is configured to count the number of tracks from the current track to the target track based on the current track number and the target track number.

The first determining unit 302 is configured to determine whether the number of the tracks between the current track and the target track reaches a predetermined value. The first determining unit 302 is further configured to generate a short tracking signal when the number of the tracks between the current track and the target track does not reach the predetermined value. Otherwise, the first determined unit 302 is further configured to generate a searching signal when the number of tracks between the current track and the target track reaches the predetermined value. In this embodiment, the predetermined value is 500.

The short tracking unit 303 is configured to move the optical head 10 to the target track in response to the short tracking signal.

The searching unit 305 is configured to search the table for the tracking errors associating with the track class which corresponds to the number of tracks between the current track of the target track in response to the searching signal. When the tracking error is found, the searching unit 305 is further configured to generate a determining signal. The searching unit 305 is further configured to generate a long tracking signal when no tracking error is found.

The second determining unit 306 is configured to determine whether the number of the tracking errors reaches the predetermined error number in response to the determining signal. The second determining unit 306 is further configured to generate a long tracking signal when the number of the tracking errors reaches the predetermined error number. Otherwise, the second determined unit 306 is further configured to generate an adaptive tracking signal. In this embodiment, the predetermined error number is equal to or larger than 2.

The long tracking unit 304 is configured to calculate first jumping tracks and determine a predetermined reached track in which the optical head 10 moves based on the target track in response to the long tracking signal. The predetermined reached track is different from the target track, and there are 50 tracks away from the target track. The long tracking unit 304 is further configured to drive the optical head 10 to move to the first jumping tracks.

The calculating unit 308 is configured to calculate a difference between the actual reached track and a predetermined reached track, and store the difference in the table 40 acting as the tracking error of the corresponding track class.

The long tracking unit 304 is further configured to calculate second jumping tracks based on the searched tracking errors and the first jumping tracks, and drive the optical head 10 to move to the second jumping tracks in response to the adaptive tracking signal. Particularly, the long tracking unit 304 calculates an average value of the found tracking errors, and adding the average value and the first jumping tracks to obtain the second jumping tracks.

In another embodiment, each track class corresponds to one tracking error, and the second determining unit 306 and the function for calculating the average value of the found tracking errors performed by the long tracking unit 304 are omitted.

Figure 3:
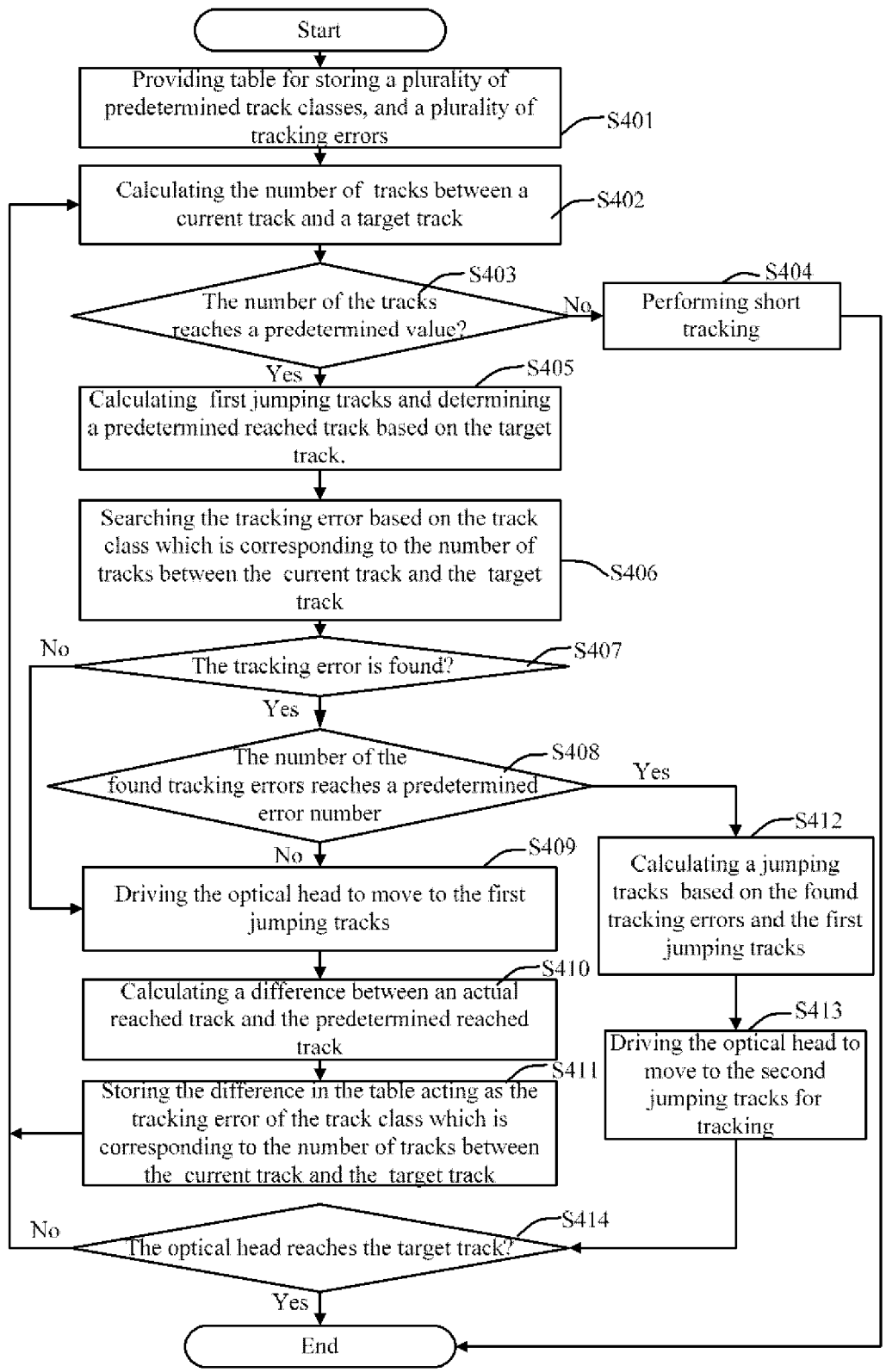
FIG. 3 shows a flow chart of a tracking method in accordance with an embodiment.

FIG. 3 shows a flow chart of a tracking method executed by an optical disc device. The optical disc device includes an optical head emitting lights for reading and writing data from or to an optical disc. The tracking method includes the following steps:

In step S401, providing a table for listing a plurality of track classes, and a plurality of tracking errors. The track classes are defined based on an amount of tracks in which the optical head moves. In this embodiment, each track classes are defined to have 100 tracks. When the optical head moves from the inner tracks to the outer tracks, the number is negative value. When the optical head move from the outer tracks to the inner tracks, the number is positive value. For one example, one track class is from −500 to −600. For another example, one track class is from 500 to 600. In this embodiment, the number of the tracking errors is 0, when the optical disc device is started up.

In step S402, calculating the number of tracks between a current track at which the optical head is currently positioned and a target track from which the optical head reads data or to which the optical head writes data.

In step S403, determining whether the number of tracks between the current track and the target track reaches a predetermined value. The predetermine value is 500. The process goes to step S404 when the number of tracks between the current track and the target track does not reach the predetermined value. The process goes to step S405 when the number of tracks between the current track and the target track reaches the predetermined value.

In step S404, performing short tracking.

In step S405, calculating first jumping tracks and determining a predetermined reached track based on the target track.

In step S406, searching tracking errors based on the track class corresponding to the number of the tracks between the current track and the target track.

In step S407, determining whether the tracking error is found. Going to step S408, when the tracking error is found. Going to step S409, when the tracking error is not found.

In step S408, determining whether the number of the found tracking errors reaches a predetermined error number. Going to step S410, when the number of the found tracking errors does not reach the predetermined error number. Going to step S412, when the number of the found tracking errors reaches the predetermined error number.

In step S409, driving the optical head to move to first jumping tracks.

In step S410, calculating a difference between an actual reached track and the predetermined reached track.

In step S411, storing the difference in the table acting as the tracking error of the track class which corresponds to the number of tracks between the current track and the target track.

In step S412, calculating second jumping tracks based on the found tracking errors and the first jumping tracks. In detail, calculating the second jumping tracks of the tracks is performed by calculating an average value of the found tracking errors, and adding the average value of the found tracking errors and the first jumping tracks.

In step S413, driving the optical head to move to the second jumping tracks for tracking.

In step S414, determining whether the optical head reaches the target track. When the optical head does not reach the target track, going to step S402. When the optical head reaches the target tracking, ending the process.

As described above, the optical disc device 100 and tracking method defines track classes and calculates tracking errors associating with the tracking classes. The corresponding tracking errors are used to compensate when the optical disc device is tracking. Therefore, the tracking time is shorter, and the optical disc device can quickly and stably read and write data.

Even though relevant information and the advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A tracking servo for driving an optical head to move with respect to an optical disc, the optical head emitting lights for reading data from or writing data to the optical disc, the optical disc comprising a plurality of tracks, the tracking servo comprising:

a storing unit storing a table for listing a plurality of track classes and tracking errors associating with the corresponding track classes, the plurality of track classes are defined based on track amount;

a counting unit counting the number of tracks between a current track in which the optical head is currently positioned and a target track from or to which the optical head reads or writes data;

a first determining unit determining whether the number of the tracks between the current track and the target track reaches a predetermined value;

a long tracking unit calculating first jumping tracks when the number of the tracks between the current track and the target track reaches the predetermined value; and a searching unit searching the table for the tracking error associating with one of the track classes which corresponds to the number of the tracks between the current track and the target track;

wherein the long tracking unit calculates second jumping tracks based on the first jumping tracks and the found tracking errors, and drives the optical head to move to the second jumping tracks for tracking.

2. The tracking servo of claim 1, wherein the number of the tracking errors is 0 in the table when the tracking servo is started up, the tracking errors are generated during the tracking servo being tracking.

3. The tracking servo of claim 2, further comprising a calculating unit, the long tracking unit determining a predetermined reached track, and driving the optical head to move to the first jumping tracks when no tracking error is found; the long tracking unit calculating a difference between an actual reached track and the predetermined reached track; and storing the difference in the table acting as the tracking error of one of the track classes which corresponds to the number of the track between the current track and the target track.

4. The tracking servo of claim 1, further comprising a second determining unit for determining whether the number of the found tracking errors reaches a predetermined error number, the long tracking unit calculating an average value of the found tracking errors, and adding the average value and the first jumping tracks to obtain the second jumping tracks when the number of the found tracking errors reaches the predetermined error number.

5. The tracking servo of claim 4, wherein the long tracking unit determines a predetermined reached track, and drives the optical head to move to the first jumping tracks when the found tracking errors does not reach the predetermined error number; the long tracking unit calculates a difference between an actual reached track and the predetermined reached track; and stores the difference in the table acting as the tracking error of one of the track classes which corresponds to the number of the track between the current track and the target track.

6. A tracking method executed by an optical disc device, the optical disc device comprising an optical head for emitting light to read or write data from or to an optical disc, the tracking method comprising:
    providing a table for listing a plurality of predetermined track classes, and a plurality of tracking errors;
    calculating the number of tracks between a current track at which the optical head is currently positioned and a target track from or to which the optical head reads or writes data;
    determining whether the number of tracks reaches a predetermined number;
    searching for the table for the corresponding tracking error when the number of tracking error reaches a predetermined number;
    calculating second jumping tracks based on the first jumping tracks and the found tracking errors; and
    driving the optical head to move to the second jumping tracks for tracking.

7. The tracking method of claim 6, further comprising a step of determining a predetermined reached track base on the target track when the number of the tracks reaches the predetermined number, and after the step of searching the table for the corresponding tracking errors, the tracking method further comprising steps of:
    determining whether the corresponding tracking error is found;
    driving the optical head to move to the first jumping tracks when no corresponding tracking errors is found;
    calculating a difference between an actual reached track and the predetermined reached track; and
    storing the difference in the table acting as the corresponding tracking error of one of the track classes which corresponds to the number of the tracks.

8. The tracking method of claim 7, further comprising steps of:
    determining whether the number of the found corresponding errors reaches a predetermined error number when the corresponding tracking error is found;
    driving the optical head to move to the first jumping tracks when the number of the found corresponding errors does not reach a predetermined error number;
    calculating a difference between an actual reached track and the predetermined reached track; and
    storing the difference in the table acting as the corresponding tracking error of one of the track classes which corresponds to the number of the tracks.

9. The tracking method of claim 8, wherein the second jumping tracks is obtained by adding the first jumping tracks and an average of the found corresponding tracking errors.

10. An optical disc device comprising:
    an optical head emitting lights for reading or writing data from or to an optical disc, the optical disc comprising a plurality of tracks;
    a storing unit storing a table for listing a plurality of track classes and tracking errors respectively associating with the track classes, the plurality of track classes are defined based on track amount;
    a counting unit counting the number of tracks between a current track at which the optical head is positioned and a target track from or to which the optical head reads or writes data;
    a first determining unit determining whether the number of the tracks reaches a predetermined number;
    a long tracking unit calculating first jumping tracks when the number of the tracks reaches the predetermined number; and
    a searching unit searching the table for the tracking error associating with one of the track classes which corresponding to number of the tracks;
    wherein the long tracking unit calculates second jumping tracks based on the first jumping tracks and the found tracking errors, and drives the optical head to move to the second jumping tracks for tracking.

11. The optical disc device of claim 10, wherein the number of tracking errors is 0 in the table when the optical disc device is started up, the tracking errors are generated during the tracking servo tracking.

12. The optical disc device of claim 11, further comprising a calculating unit, the long tracking unit determining a predetermined reached track, and driving the optical head to move to the first jumping tracks when no racking error is found; the long tracking unit calculating a difference between an actual reached track and the predetermined reached track; and storing the difference in the table acting as the tracking error of one of the track classes which corresponds to the number of the track.

13. The optical disc device of claim 10, further comprising a second determining unit for determining whether the number of the found tracking errors reaches a predetermined error number, the long tracking unit calculating an average value of the found tracking errors and adding the average value and the first jumping tracks to obtain the second jumping tracks.

14. The optical disc device of claim 13, wherein the long tracking unit determines a predetermined reached track, and drives the optical head to move to the first jumping tracks when the found tracking errors does not reach the predetermined error number; the long tracking unit calculates a difference between an actual reached track and the predetermined reached track; and stores the difference in the table acting as the tracking error of one of the track classes which corresponds to the number of the tracks between the current track and the target track.

* * * * *